United States Patent
Dalton

(10) Patent No.: US 7,216,712 B2
(45) Date of Patent: May 15, 2007

(54) TREATMENT OF OIL WELLS

(75) Inventor: Dan Dalton, Walden, CO (US)

(73) Assignee: Praxair Technology, Inc., Danbury, CT (US)

(*) Notice: Subject to any disclaimer, the term of this patent is extended or adjusted under 35 U.S.C. 154(b) by 37 days.

(21) Appl. No.: 10/730,925

(22) Filed: Dec. 10, 2003

(65) Prior Publication Data

US 2005/0126784 A1    Jun. 16, 2005

(51) Int. Cl.
*E21B 37/06* (2006.01)

(52) U.S. Cl. ............ 166/312; 166/263; 166/303; 166/304; 166/310; 166/371

(58) Field of Classification Search ............ None
See application file for complete search history.

(56) References Cited

U.S. PATENT DOCUMENTS

| | | | |
|---|---|---|---|
| 4,033,411 A | 7/1977 | Goins | 166/257 |
| 4,113,011 A * | 9/1978 | Bernard et al. | 166/403 |
| 4,212,354 A | 7/1980 | Guinn | 166/303 |
| 4,250,965 A | 2/1981 | Wiseman, Jr. | 166/305 |
| 4,343,362 A | 8/1982 | Turta et al. | 166/267 |
| 4,374,545 A | 2/1983 | Bullen et al. | 166/280.1 |
| 4,390,068 A | 6/1983 | Patton et al. | 166/267 |
| 4,455,175 A | 6/1984 | Settineri et al. | 134/5 |
| 4,455,860 A | 6/1984 | Cullick et al. | 73/19 |
| 4,495,995 A * | 1/1985 | Chen et al. | 166/270 |
| 4,536,222 A | 8/1985 | Settineri et al. | 134/5 |
| 4,593,763 A | 6/1986 | Burke | 166/302 |
| 4,609,043 A * | 9/1986 | Cullick | 166/268 |
| 4,617,993 A | 10/1986 | Brown | 166/250 |
| 4,678,036 A | 7/1987 | Hartman et al. | 166/273 |
| 4,679,627 A | 7/1987 | Harrison | 166/249 |
| 4,800,957 A | 1/1989 | Stevens, Jr. et al. | 166/268 |
| 4,899,817 A | 2/1990 | Djabbarah | 166/252 |
| 5,022,467 A * | 6/1991 | Irani et al. | 166/403 |
| 5,045,220 A * | 9/1991 | Harris et al. | 507/221 |
| 5,381,863 A | 1/1995 | Wehner | 166/263 |
| 5,499,679 A | 3/1996 | Loree | 166/308 |
| 5,632,336 A | 5/1997 | Notz et al. | 166/402 |
| 5,711,373 A | 1/1998 | Lange | 166/252.2 |
| 6,170,264 B1 * | 1/2001 | Viteri et al. | 60/671 |
| 6,305,472 B2 | 10/2001 | Richardson et al. | 166/305.1 |
| 6,988,552 B2 | 1/2006 | Wilson et al. | 166/302 |

FOREIGN PATENT DOCUMENTS

WO    WO 0138694 A1    5/2001

OTHER PUBLICATIONS

Llave, F. et al., "Use of Entrainers For Improving Gas Mobility Control And Displacement Efficiency", National Technical Information Service (Nov. 1988).

Raible, C., "Improvement In Oil Recovery Using Cosolvents With Co(Sub 2) Gas Floods", National Technical Information Service (Jan. 1992).

* cited by examiner

*Primary Examiner*—Zakiya W. Bates
(74) *Attorney, Agent, or Firm*—Flora W. Feng

(57) ABSTRACT

Hydrocarbon solids are removed from an oil well by feeding into the oil well a composition comprising at least 40 vol. % dense phase carbon dioxide and at least 30 vol. % of a $C_1$–$C_3$ alkanol component and optionally one or more surfactants, under a pressure of 300 to 10,000 psia and a temperature of 90° F. to 120° F., holding the composition in the well to solubilize hydrocarbon solids, and then removing from the well a liquid composition comprising solubilized hydrocarbon solids and alkanol.

8 Claims, No Drawings

TREATMENT OF OIL WELLS

FIELD OF THE INVENTION

The present invention relates to treating oil production wells to improve their operational capacity.

BACKGROUND OF THE INVENTION

The presence of paraffin and asphaltene components (waxes) in hydrocarbon fluids can present a host of problems for the producer, transporter, and refiner of those fluids and of products obtained from those fluids. The presence of paraffin sand asphaltene components is similar to the formation of scale or rust. Their presence in the hydrocarbon reservoir, wellbore tubing, transfer lines, storage vessels, and pipelines can lead to serious problems. For a producing well, these components cause a steady fall off of production rates over time, eventually falling to unacceptable or unprofitable levels.

Upon the examination of hydrocarbon production reservoirs, it appears that most production reservoirs exhibit characteristics similar to a distillation process. After a production reservoir has been tapped, the light end hydrocarbon components are the first to leave. This departure begins: to increase the concentration of heavier liquid hydrocarbons within the reservoir. This causes a reduction in the reservoir pressure, thus reducing the drive efficiency of the well, and reduces the mobility of the heavier hydrocarbon fractions.

The lower reservoir pressure and the presence of less mobile, heavier hydrocarbon fractions reduce well production in a systematic, yet empirical graphic interpretation. It is known that moderation of production rates can reduce the deposition of wax and asphaltene, even though there may be a trade-off between the formation of naturally formed asphaltene and wax chokes. These natural chokes act as a speed control for the production rate of crude oil from a completed well. If these constraints are ignored, the consequences have a profound effect on the life expectancy of a producing site (i.e. reduced production). If the velocity when bringing oil to the surface is too slow, the probability of wax deposits is increased. Similarly, precipitation of the heavier fractions may occur due to environmental cooling as the fluid passes through low temperature zones. Another problem occurs when oil velocity is too high. The likelihood of asphaltene deposition is increased by the resulting increase in streaming potential.

Production rates from hydrocarbon wells decrease over time as the well becomes clogged with hydrocarbon deposits such as asphaltenes and paraffins. The industry has developed several technologies for addressing this problem, but each has limitations. These technologies are selected based on several criteria including the type of rock formation, subsurface conditions, the age of the field, and the cause of reduced production.

The most common technology involves injecting solvents, such as toluene, xylene or hot oiling the well in an attempt to dissolve the deposits. A common method involves injecting several hundred gallons of solvent downhole and following it with oil or water. Most material injected into the well will absorb back into the oil, and run into the tank battery. If the problem is bad enough then the material is swabbed into a tank. The oil is separated and the water and residual solvent is hauled to a disposal site. The principal problems are those encountered in the handling of these solvents, such as their toxicity to personnel handling them and the detrimental effects that could be caused to the surrounding soil and water if any amounts of these solvents are spilled.

Other methods inject surfactants downhole in an attempt to wash out the deposits. Newer methods inject biologically active microbes into the formation to consume the deposits. However, these methods have relatively high costs and/or present safety and environmental hazard issues that can be difficult to overcome.

Thus, there remains a need for an effective method of removing some or all of these paraffinic and/or asphaltene solids from a production well, without posing hazards to personnel or to the surrounding environment.

BRIEF SUMMARY OF THE INVENTION

The present invention solves these and other problems, and provides numerous advantages described herein, in a method for removing hydrocarbon solids from an oil well comprising
 (a) feeding into an oil well having hydrocarbon solids therein a composition comprising at least 40 vol. % dense phase carbon dioxide and at least 30 vol. % of an alkanol component selected from the group consisting of alkanols containing 1 to 3 carbon atoms and mixtures thereof, and optionally one or more surfactants, under a pressure of 300 to 10,000 psia and a temperature of 90° F. to 120° F.,
 (b) allowing the composition to remain in the well whereby hydrocarbon solids in the well solubilize with said composition, and then
 (c) removing from said well a liquid composition comprising said solubilized hydrocarbon solids and alkanol.

As used herein, "oil well" means a well out of which oil in liquid form can flow from subterranean deposits, regardless of whether gaseous hydrocarbons also emanate therefrom.

As used herein, "hydrocarbon solids" means hydrocarbons (i.e. compounds composed predominantly of carbon and hydrogen) that are solid at the conditions existing: in an oil well or at the conditions-existing at the earth's surface outside the oil well. Hydrocarbon solids typically comprise paraffins and asphaltenes.

As used herein, "dense phase carbon dioxide" means carbon dioxide in the form it takes at a temperature 10° F. below its critical temperature or higher and at a pressure 100 psi below its critical pressure or higher.

As used herein, a substance "solubilizes" or becomes "solubilized" when it forms a pumpable liquid with another one or more materials, whether by forming a solution or dispersion of the substance in the one or more other materials, or a solution or dispersion of the one or more other materials in the substance.

DETAILED DESCRIPTION OF THE INVENTION

The composition used in the present invention contains, at least, dense phase carbon dioxide and an alkanol component. The term "downhole composition" will be used in the following description to refer to the composition when it is ready to be fed down an oil well, meaning that it contains all components that it will contain as it is fed down the oil well and that it is at the desired temperature and pressure at which it will be fed down the oil well.

The preferred dense phase carbon dioxide is supercritical carbon dioxide, wherein the carbon dioxide is at a temperature above its critical temperature of 87.8° F. and above its critical pressure of 1070 psia. However, carbon dioxide that is at a temperature somewhat below its critical temperature and/or at a pressure somewhat below its critical pressure can be used effectively as well.

The dense phase carbon dioxide comprises at least 40 vol. % of the downhole composition. More preferred amounts are at least 50 vol. %.

The alkanol component can comprise methanol, ethanol, n-propanol, or isopropanol, or a mixture of any two or more of these compounds. The preferred alkanol is methanol.

The alkanol component comprises at least 30 vol. % of the downhole composition (all volume percentages described herein are based on the carbon dioxide in its dense phase form). Preferably, the alkanol component comprises at least 35 vol. % up to 40 vol. %, or even up to 50 vol. % of the composition used in the present invention.

In one preferred embodiment of the present invention, the dense phase carbon dioxde and the alkanol component are the only substances present in the downhole composition. However, other compounds that are effective as solvents for the solid hydrocarbons can be present. It is preferred however that aromatic compounds, that is, compounds containing one or more than one benzene ring, should not be present in the downhole composition. Examples of such aromatic compounds include benzene, toluene, and xylenes.

In another preferred embodiment, a surfactant component can also be present in the composition to aid in solvency and dispersant rates of attrition during the treatment. The surfactant component can comprise one or more than one surfactant compound, selected from anionic, cationic, nonionic and amphoteric surfactant compounds and combinations thereof, although it is generally preferred not to use anionic and cationic compounds together in the one composition. Examples of suitable surfactants abound in the surfactant field, and can be determined from any of the publicly available handbooks and catalogs that describe surfactant products. The chemical identity of an effective surfactant component, and the amount thereof that is present in the downhole composition, can readily be determined by tests in the oil well to be treated. Effective amounts of the surfactant component will generally be up to 5 vol. % of the composition, preferably up to about 1 vol. % of the composition. The surfactant can be added to the other components when the downhole composition is being prepared. However, the surfactant can instead be fed into the oil well after the composition (containing some, or no, surfactant) has been fed into the oil well, but before the composition is removed from the oil well.

One preferred manner for preparing for and carrying out the present invention includes the following steps. The alkanol component and the carbon dioxide are combined. This can be accomplished by, first, partially filling a vessel of with an amount of the alcohol(s) forming the alkanol component necessary to obtain the desired alcohol/carbon dioxide ratio. Then, carbon dioxide is fed into the vessel in an amount necessary to provide the desired ratio of the alkanol component to the carbon dioxide. The carbon dioxide can be provided from a conventional cylinder or larger storage/supply container which typically holds carbon dioxide under pressure. Any other components such as surfactant, additional solvent, and the like, are added to the vessel, or injected into the stream of $CO_2$ and methanol while going downhole, in the desired amounts thereof. Next, the mixture of alkanol and carbon dioxide (and any other components present) is heated, for instance by pumping it through a heat exchanger, to achieve the desired temperature.

The mixture is then injected downhole. Preferably a nearly constant pump pressure is maintained, varying flow as necessary. The mixture is held downhole, by not releasing the pressure on the well opening, for a period of time sufficient to allow the mixture to solubilize solid hydrocarbon deposits. Suitable hold times range from several minutes up to one to four days. One way to determine an effective length of time is to determine the pressure at the well opening when injection of the feed mixture is completed, and to permit the mixture to remain in the well until the pressure has decreased by a predetermined amount such as by 25%. The decrease in pressure indicates that the feed mixture has penetrated into the formation and solubilized hydrocarbon solids. After the desired hold time, the pressure on the mixture is released, allowing the mixture containing solubilized hydrocarbons to flow out of the well.

Preparing the downhole composition for injection into the oil well requires a high pressure pump having a minimum 5000 psig working pressure; and a heater capable of heating the composition to the preferred supercritical temperature. One suitable heater uses an indirect line heater using glycol as the heating medium and tubes rated to the maximum discharge of the pump at 300° F. Preferably the temperature of the downhole composition is set at a value within 10° F. of the temperature at the bottom of the well, (if possible or at least mid hole temperature, to minimize the risk of imposing thermal shock on the piping at the bottom of the well. In addition, the temperature of the downhole composition should be below the melting point of the hydrocarbon solids that are to be removed by the method of the present invention, as it is desired to remove those materials by solubilization rather than by melting.

Injection of the carbon dioxide into the wellbore to control its pressure can be carried out in any of several ways, preferably accompanied by controlling its critical pressure for maximum heating results. The preferred way which in some cases is also more economical is through use of tubing which is brought to the oil well location coiled on a portable unit, rigged up next to the well, and uncoiled and fed into the wellbore, preferably to the full formation depth or short thereof. The heated composition is then injected into the coil tubing. The interior dimensions of the coil tubing would be sized for to allow the carbon dioxide to remain above its critical pressure allowing best heating control and maximum heat. A second way, whose adaptation would depend principally on economics, would be to set a packer using the wells production tubing and then injecting the mixture down the tubulars.

After the composition has been held in the well for the desired period of time, the pressure being applied to the well at its opening is decreased or removed, whereupon a flowable, pumpable liquid composition is removed from the well. This removal can occur without external aid, relying on the internal pressures within the well itself or on remaining energy from the injected carbon dioxide, or can be aided by suitable a pump that withdraws the liquid from the well. If the well is allowed to flow back by itself the flow back should be controlled using a choke valve, increasing the flow back incrementally after the pressure begins to drop.

The composition that is recovered from the well is a liquid that comprises solubilized in it hydrocarbons that had formed the solids that the invention sought to remove from the oil well. It also contains alkanol that had been a component of the downhole composition.

The method of the present has been shown to be effective in removing undesired deposits of solid hydrocarbons from within the well, resulting in improved production rates and economic value for the treated well. This method is similar in effect to the use of hydrocarbon solvents containing aromatic hydrocarbon, as if toluene or xylene were injected into a well to help dissolve deposits, but without posing the environmental and safety issues that aromatic compounds present.

A main advantage of the present invention is the ability to use polar and non-polar solvents, alcohol and carbon dioxide, simultaneously in the wellbore formation. The downhole conditions typically comprise saline water (polar) and hydrocarbons (non-polar). The mixture of carbon dioxide and alcohol allows effective penetration through both fluids so that the targeted deposits (asphaltenes and paraffins) can be dissolved and later removed. In addition, the oil produced after treatment by the method of the present invention has contained acceptable parts per million of residual alcohol levels.

Another advantage is that the method of the present invention is carried out at the well from which production of oil will resume or will be enhanced, as distinguished from other technologies wherein compositions are injected into one or more injection wells some distance from the production well itself in the hope of increasing the flow of hydrocarbons out of the production well without putting anything down the production well.

What is claimed is:

1. A method for removing hydrocarbon solids from an oil well comprising
   (a) feeding into an oil well having hydrocarbon solids therein a feed composition comprising at least 40 vol. % dense phase carbon dioxide and at least 30 vol. % of alkanol selected from the group consisting of alkanols containing 1 to 3 carbon atoms and mixtures thereof, and optionally one or more surfactants, under a pressure of 300 to 10,000 psia and a temperature of 90° F. to 120° F.,
   (b) allowing the feed composition to remain in the well, whereby hydrocarbon solids in the well solubilize with said composition, and then
   (c) removing from said well a liquid product composition comprising said solubilized hydrocarbon solids and said alkanol.

2. A method according to claim 1 wherein the feed composition that is fed in step (a) also comprises a surfactant component.

3. A method according to claim 2 wherein the surfactant component is present in said feed composition when the feed composition is fed into said oil well.

4. A method according to claim 1 further comprising feeding a surfactant component into said oil well after said feed composition is fed into said oil well, and before said liquid product composition is removed from said well.

5. A method according to claim 1 wherein said feed composition comprises at least 50 vol. % dense phase carbon dioxide.

6. A method according to claim 5 wherein said feed composition is fed at a temperature of 90° F. to 110° F.

7. A method according to claim 1 wherein said feed composition is fed at a temperature of 90° F. to 110° F.

8. A method according to claim 1 wherein said feed composition is free of aromatic compounds.

* * * * *